United States Patent

Nelson

[15] 3,696,136

[45] Oct. 3, 1972

[54] METHOD OF STABILIZING SODIUM ALUMINUM DIETHYL HYDRIDE

[72] Inventor: Gunner E. Nelson, Baton Rouge, La.

[73] Assignee: Ethyl Corporation, New York, N.Y.

[22] Filed: Oct. 9, 1970

[21] Appl. No.: 79,682

[52] U.S. Cl. .............................. 260/448 A, 252/188
[51] Int. Cl. ................................................ C07f 5/06
[58] Field of Search .................. 260/448 A; 252/188

[56] References Cited

UNITED STATES PATENTS

| R25,179 | 5/1962 | Ziegler et al. | 260/448 A |
|---|---|---|---|
| 2,786,860 | 3/1957 | Ziegler et al. | 260/448 A |
| 3,255,224 | 6/1966 | Ziegler et al. | 260/448 A |

FOREIGN PATENTS OR APPLICATIONS

| 1,116,664 | 11/1961 | Germany | 260/448 A |

OTHER PUBLICATIONS

Chemical Abstracts, Vol. 67, 70140c (1967)
Chemical Abstracts, Vol. 57, 16109b (1962)
Chemical Abstracts, Vol. 57, 12520c (1962)
Ashby et al. Inorg. Chem. Vol. 2, pp. 499– 504 (1963)
Kobetz et al. Inorg. Chem. Vol. 2, pp. 859– 861 (1963)

*Primary Examiner*—Tobias E. Levow
*Assistant Examiner*—H. M. S. Sneed
*Attorney*—Donald L. Johnson, John F. Sieberth and Arthur G. Connolly

[57] ABSTRACT

Sodium aluminum diethyl dihydride, a chemical reducing agent, is more soluble and more stable in liquid alkyl benzenes than it is in benzene.

7 Claims, No Drawings

METHOD OF STABILIZING SODIUM ALUMINUM DIETHYL HYDRIDE

Sodium aluminum diethyl dihydride has been suggested for use as a reducing agent (Ziegler et al., U.S. pat. No. 2,915,541; 3,143,542). The solubility of this compound in certain organic solvents such as benzene has been recognized as an advantageous property for this use (Jenkner German U.S. Pat. No. 1,116,664).

This invention involves, inter alia, the discovery that sodium aluminum diethyl dihydride is more stable when dissolved in a liquid alkyl benzene solvent such as xylene than when dissolved in benzene. In addition, sodium aluminum diethyl dihydride has been found to have a greater solubility in the alkyl benzenes (e.g., toluene, xylene, etc.) than it does in benzene. Accordingly, this invention enables the provision of more concentrated reagent solutions of the reducing agent which, under normal conditions, may be stored, transported, and used without incurring significant decomposition. Further, excessive shipping costs are avoided. In handling the reagent solutions, ordinary precautions should be observed such as avoiding exposure to flames or excessive exposure to moisture or the atmosphere.

Thus one embodiment of this invention provides sodium aluminum diethyl dihydride dissolved in a liquid alkyl benzene.

In another embodiment, sodium aluminum diethyl dihydride solutions of enhanced stability are formed by dissolving or furnishing the sodium aluminum diethyl dihydride in a liquid alkyl benzene solvent.

The foregoing solutions are particularly suitable for use as reagents for effecting a variety of chemical reductions, the alkyl benzene solvent serving the multiple functions of protecting the sodium aluminum diethyl dihydride against excessive decomposition and providing an environment or medium in which the reducing agent may be furnished in relatively high concentration and in which the desired reduction reaction may be effected, with or without further dilution.

Suitable alkyl benzenes for use in this invention include toluene, the xylenes, mesitylene, the cymenes, cumene, the ethyl toluenes, the diethyl benzenes, butyl benzene, sec-butyl benzene, tert-butyl benzene and other liquid mononuclear aromatic hydrocarbons having one or more alkyl substituents in the nucleus. The solvents should have freezing points below about 15° C. and more preferably below 0° C.——i.e., they should exist in the liquid state of aggregation under average room temperature conditions. The use of toluene or xylene (the ortho, meta, or para isomers; or mixed isomers) is particularly preferred as the resultant solutions have good thermal stability and handling properties, and the solvents are relatively inexpensive and readily available.

The concentration of the sodium aluminum diethyl dihydride may be varied dependent upon the identity of the particular alkyl benzenes solvent being utilized and the particular use for which the solution is intended. For example, the solubility of sodium aluminum diethyl dihydride in toluene is sufficient at 25° C. to furnish solutions containing somewhat above 16 weight percent of the reagent. In xylene its solubility at 25° C. ranges up to approximately 26 weight percent. To minimize shipping costs it is generally preferable to provide a solution of this invention containing at least about 10 percent by weight of sodium aluminum diethyl dihydride. Accordingly, toluene solutions containing from about 10 to about 15 percent by weight of sodium aluminum diethyl dihydride and xylene solutions containing from about 10 to about 25 percent by weight of sodium aluminum diethyl dihydride are particularly preferred. A 15 percent solution in toluene and a 25 percent solution in xylene have approximately the same densities--i.e., 7.33 and 7.34 pounds per gallon, respectively. The viscosity of the xylene solution exceeds that of the toluene solution.

The advantages of this invention were illustrated by performing a series of standard thermal stability tests on solutions of sodium aluminum diethyl dihydride held at 35° C. by means of a constant temperature bath. Measurements were made of the amount of gas evolution occurring during an extended period of time. In these tests the greater the amount of gas evolved per unit weight of sodium aluminum diethyl dihydride, the more unstable the system.

In one such experiment a 25 weight percent solution of sodium aluminum diethyl dihydride in xylene (9.4 grams of $NaAl(C_2H_5)_2H_2$; 37.6 grams of solution) was found to evolve 0.92 milliliters of gas per gram of sodium aluminum diethyl dihydride per day.

In another experiment wherein small pieces of mild steel and brass were present in the flask containing an approximately 25 percent solution of sodium aluminum diethyl dihydride in xylene (11.9 grams of $NaAl(C_2H_5)_2H_2$; 47.65 grams of solution) the rate of gas evolution was 0.93 milliliters per gram of sodium aluminum diethyl dihydride per day.

In contrast, a 7.3 percent solution of sodium aluminum diethyl dihydride in benzene (3.6 grams of $NaAl(C_2H_{52}H_2$; 49.6 grams of solution) evolved gas at the rate of 2.1 milliliters per gram of sodium aluminum diethyl dihydride per day.

We claim

1. A method of protecting sodium aluminum diethyl dihydride against excessive decomposition normally tending to occur when maintained for an extended period of time in relatively high concentration in a reagent solution which comprises dissolving and maintaining the sodium aluminum diethyl dihydride at a concentration of at least about 10 weight percent in a liquid alkyl benzene solvent.

2. A method according to claim 1 wherein the alkyl benzene is toluene.

3. A method according to claim 1 wherein the alkyl benzene is xylene.

4. A method in accordance with claim 1 wherein from about 10 to about 15 weight percent sodium aluminum diethyl dihydride is dissolved in toluene.

5. A method in accordance with claim 1 wherein about 15 weight percent sodium aluminum diethyl dihydride is dissolved in toluene.

6. A method in accordance with claim 1 wherein from about 10 to about 25 weight percent sodium aluminum diethyl dihydride is dissolved in xylene.

7. A method in accordance with claim 1 wherein about 25 weight percent sodium aluminum diethyl dihydride is dissolved in xylene.

* * * * *